(12) United States Patent
Uhlik et al.

(10) Patent No.: US 7,363,376 B2
(45) Date of Patent: Apr. 22, 2008

(54) METHOD AND APPARATUS FOR GENERATING AN IDENTIFIER TO FACILITATE DELIVERY OF ENHANCED DATA SERVICES IN A MOBILE COMPUTING ENVIRONMENT

(75) Inventors: Christopher Uhlik, Danville, CA (US); Neeraj Sinha, San Jose, CA (US); Zhifeng Cai, Mountain View, AZ (US)

(73) Assignee: ArrayComm LLC, San Jose, CA (US)

( * ) Notice: Subject to any disclaimer, the term of this patent is extended or adjusted under 35 U.S.C. 154(b) by 672 days.

(21) Appl. No.: 09/919,777

(22) Filed: Jul. 31, 2001

(65) Prior Publication Data

US 2003/0028649 A1    Feb. 6, 2003

(51) Int. Cl.
G06F 15/16    (2006.01)

(52) U.S. Cl. .................. 709/227; 709/219; 709/228; 455/414.3; 455/433

(58) Field of Classification Search ........ 709/227–228, 709/219, 230–231; 370/260, 389; 713/168, 713/171; 455/433, 436, 414.3, 434
See application file for complete search history.

(56) References Cited

U.S. PATENT DOCUMENTS

| | | | | |
|---|---|---|---|---|
| 6,006,266 | A * | 12/1999 | Murphy et al. | 709/227 |
| 6,269,402 | B1 * | 7/2001 | Lin et al. | 709/227 |
| 6,275,693 | B1 * | 8/2001 | Lin et al. | 455/414.3 |
| 6,317,831 | B1 * | 11/2001 | King | 713/171 |
| 6,363,482 | B1 * | 3/2002 | Shani | 713/168 |
| 6,522,880 | B1 * | 2/2003 | Verma et al. | 455/436 |
| 6,584,567 | B1 * | 6/2003 | Bellwood et al. | 713/171 |
| 6,654,808 | B1 * | 11/2003 | Chuah | 709/227 |
| 6,950,862 | B1 * | 9/2005 | Puthiyandyil et al. | 709/220 |
| 6,963,582 | B1 * | 11/2005 | Xu | 370/466 |
| 6,990,339 | B2 * | 1/2006 | Turanyi et al. | 455/432.1 |
| 2001/0053694 | A1 * | 12/2001 | Igarashi et al. | 455/433 |
| 2002/0068565 | A1 * | 6/2002 | Purnadi et al. | 455/436 |
| 2002/0116501 | A1 * | 8/2002 | Ho et al. | 709/227 |
| 2002/0145129 | A1 * | 10/2002 | Sun-Jin et al. | 252/301.4 R |
| 2002/0146129 | A1 * | 10/2002 | Kaplan | 380/270 |
| 2002/0174194 | A1 * | 11/2002 | Mooney et al. | 709/219 |
| 2002/0191600 | A1 * | 12/2002 | Shah et al. | 370/389 |
| 2003/0012149 | A1 * | 1/2003 | Maggenti et al. | 370/260 |
| 2003/0135626 | A1 * | 7/2003 | Ray et al. | 709/228 |
| 2003/0219020 | A1 * | 11/2003 | Honary et al. | 370/395.4 |
| 2004/0008645 | A1 * | 1/2004 | Janevski et al. | 370/331 |
| 2004/0053613 | A1 * | 3/2004 | Karaoguz et al. | 455/436 |
| 2005/0003798 | A1 * | 1/2005 | Jones et al. | 455/410 |
| 2005/0246445 | A1 * | 11/2005 | Panasyuk et al. | 709/227 |

* cited by examiner

*Primary Examiner*—Thu Ha Nguyen
(74) *Attorney, Agent, or Firm*—Blakely Sokoloff Taylor & Zafman (57) ABSTRACT

An apparatus and method for generating an identifier to facilitate delivery of enhanced data services in a wireless computing environment is presented. In accordance with one aspect of the invention, a method is presented comprising receiving a request to establish a communication session between a subscriber unit in a wireless communication system and a data network access server through a basestation, and selectively generating a communication session identifier to uniquely identify the communication session from a plurality of communication sessions supported by the network access server to enable mobility management within the point-to-point communication session between the basestation and the network access server.

13 Claims, 6 Drawing Sheets

| EUT_ID | COOKIE | K_n | Cert_key |
|---|---|---|---|
| 00214 | xxxx | YYYY | nnn |
| ⋮ | ⋮ | ⋮ | ⋮ |
| 00214 | xxxx | ZZZZ | nnn |
| 00223 | pppp | QQQQ | nnn |
|  |  |  |  |
| 01020 | xyza | BCDE | nnn |

FIG. 6B

| Session_ID | Cert_key |
|---|---|
| xxxx-YYYY | nnn |
| xxxx-ZZZZ | nnn |
| ⋮ | ⋮ |
| ffff.GGGG | nnn |
| pppp.QQQQ | nnn |
| xyza.BCDE | nnn |

METHOD AND APPARATUS FOR GENERATING AN IDENTIFIER TO FACILITATE DELIVERY OF ENHANCED DATA SERVICES IN A MOBILE COMPUTING ENVIRONMENT

TECHNICAL FIELD

The present invention generally relates to the field of wireless communication systems and, more particularly, to an architecture, protocol and related methods to facilitate the delivery of enhanced data services in a mobile computing environment.

BACKGROUND

With recent advances in technology, the traditional notion of a "computing device" is evolving from a typical desktop or laptop computing system to include such ultra-mobile devices as personal digital assistants (colloquially referred to as PDAs, or "palmtop" computers), and wireless communication devices such as, for example, wireless cellular subscriber units (or handsets), and personal handy-phone (PHP) communicators. With this rapid evolution comes the expectation from the consuming public that such mobile computing devices will provide all of the networking features that they enjoy on their desktop computing systems, i.e., electronic mail (email), Internet access, and the like. Accordingly, wireless communication systems have evolved, albeit slowly, to provide such mobile computing devices with enhanced data services.

Those skilled in the art will appreciate, however, that this evolution is not yet complete and that conventional techniques for interfacing wireless communication devices with a global data network such as the Internet have yet to be perfected. A number of limitations still exist which have retarded acceptance and use of such wireless computing devices to access data networking resources.

One of the limitations associated with providing such enhanced data services lies in the original architecture of each of the wireless communication system(s) and the data network(s). Architecturally, the wireless communication infrastructure and the data networking infrastructure each rely on technically disparate communication protocols to facilitate the flow of information between network elements. Currently, to access a data network using a wireless computing device, a wireless connection is established from a modulator/demodulator (MODEM), coupled to the client computing/communication system, and a basestation using a wireless communication protocol, whereupon a point-to-point connection is established with a network access server (NAS, also referred to as an Internet Service Provider (ISP), a tunnel switch, and the like), which provides an Internet Protocol (IP) connection to any of a number of network resources (e.g., content servers).

To traverse these otherwise disparate networks, a process colloquially referred to as tunneling is employed. Tunneling involves encapsulating a data packet conforming to the protocol of the communication end-points (e.g., the wireless computing system and the desired network end-point) within a wrapper data packet conforming to the protocol of the transmission means to facilitate transmission of the encapsulated data packet across network boundaries.

An example of a popular tunneling protocol is described in the Internet Engineering Task Force (IETF) Request for Comment (RFC) 2661 entitled *Layer Two Tunneling Protocol (L2TP)*, by Townsley, et al. (August, 1999), which is incorporated herein by reference for all purposes. L2TP is a protocol from the IETF for creating virtual private networks (VPNs) over the Internet. One of the appealing attributes of L2TP is its support for non-Internet Protocol (non-IP) protocols. Simplistically, the L2TP is defined as a series of control instructions with embedded control attributes, referred to as an attribute-value pair (AVP). L2TP, as it currently exists, provides an efficient means of multiprotocol communication in a static (i.e., non-mobile, e.g., desktop) networking environment.

That is, the current L2TP architecture does not anticipate the need for wireless handovers, wherein an internet communication session will move from one network end-point (e.g., basestation) to another. In this regard, L2TP fails to address mobile-centric security issues such as, for example, authentication during handovers. Security issues aside, simply applying conventional L2TP to mobile computing environments would result in the creation of obsolete communication sessions (colloquially referred to as zombie communication sessions) between the basestation that is no longer servicing a particular computing client and the network access server. It will be appreciated that even though they are no longer servicing a particular computing client, they continue to consume system resources (e.g., basestation, tunnel switch and/or network access server) degrading system performance. Insofar as the network resource is not "aware" of the change in the point of access of the wireless communication device, any response by the network resource to currently pending requests will likely be routed via the zombie communication session and, thus, will not be received by the wireless communication device.

Each of the limitations identified above has served to retard acceptance and adoption of the technology by consumers. Accordingly, a system and related methods facilitating enhanced data services to wireless communication devices is required, unencumbered by the limitations commonly associated with conventional techniques. Just such a solution is detailed below.

SUMMARY

An apparatus and method for generating an identifier to facilitate delivery of enhanced data services in a wireless computing environment is presented. In accordance with one aspect of the invention, a method is presented comprising receiving a request to establish a communication session between a subscriber unit in a wireless communication system and a data network access server through a basestation, and selectively generating a communication session identifier to uniquely identify the communication session from a plurality of communication sessions supported by the network access server to enable mobility management within the point-to-point communication session between the basestation and the network access server.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

The present invention is directed to an architecture, protocol and related methods to facilitate the delivery of enhanced data services to mobile computing devices (e.g., subscriber unit, end-user terminal (wireless modem), and the like) through a wireless communication system. According to one aspect of the present invention, an enhanced point-to-point communication protocol (EPPP) is introduced which facilitates the exchange of mobility data between a network access server (or, regional tunnel switch (TSW)) and one or more wireless communication system network element(s), i.e., basestation(s). In accordance with an example implementation detailed below, the EPPP is comprised of an extension to the well-known Layer Two Tunneling Protocol (L2TP). As described herein, the exchange of such mobility management information is facilitated through L2TP control commands using one or more of five (5) newly introduced attribute-value pairs (AVP). According to one embodiment of the present invention, the EPPP is selectively introduced in one or more network elements, e.g., subscriber unit(s), network access server(es), basestation(s), etc. in the form of an innovative communications agent. It will be appreciated from the discussion to follow, however, that the EPPP may well be introduced to such elements in other forms such as, for example, a revised version of the L2TP protocol which includes the additional mobility management AVP extensions introduced herein.

In accordance with another aspect of the present invention, the innovative communications agent may well include one or more of a security module and/or a communication session identification generator. As will be developed in greater detail below, the security module facilitates security features such as, for example, authentication services and other anti-replay attack services. The communication session identification generator selectively generates communication session identifiers to facilitate multiple network sessions through a single wireless end-user terminal, support dynamic session routing and handovers, and to foster zombie session clean-up.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Network Providing Enhanced Data Services to Wireless Client(s)

Figure 1:
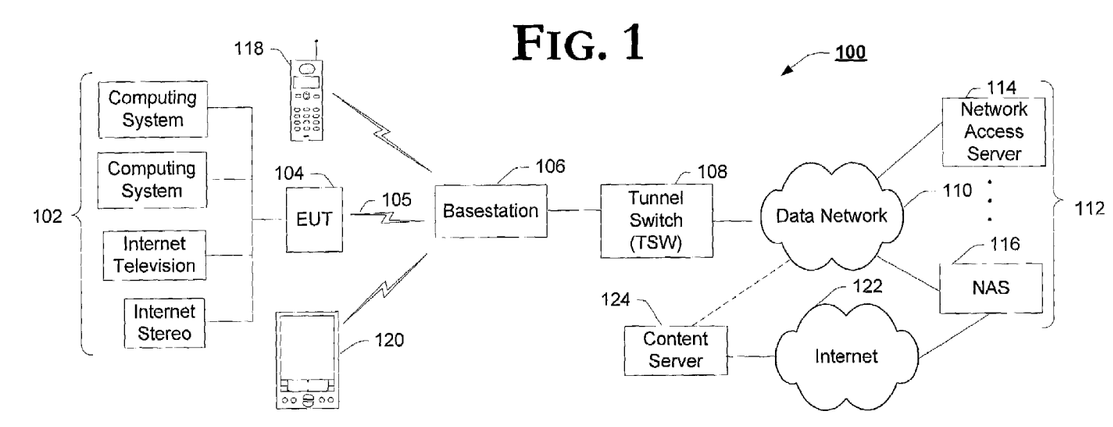
FIG. 1 is a block diagram of a wireless communication system facilitating enhanced data services, in accordance with the teachings of the present invention.

FIG. 1 provides a block diagram of an example communication network incorporating the teachings of the present invention to provide enhanced data services to wireless computing devices. In accordance with the example illustration of FIG. 1, network 100 is presented comprising one or more end-user computing device(s) (EUD) 102 communicatively coupled to a network access server (NAS) 112 through a wireless network component and a data network component. As shown, the end-user device(s) 102 are coupled to a NAS 112 through a wireless communication channel 105 established between an end-user terminal (EUT) 104 (used interchangeably herein with subscriber unit) and a wireless communication system basestation 106, and a tunnel switch (TSW) 108 or TSW/network access server combination 108. In addition to the foregoing, network 100 also illustrates wireless-enabled computing devices such as, for example, wireless subscriber unit 118 (a computing device in its own right) and a palmtop computing device 120 with an integrated end-user terminal (e.g., a wireless modem, not specifically denoted). The connection to a NAS 112, e.g., NAS 116, facilitates communication with purveyors of enhanced data services, e.g., content server 124 via Internet 122.

As used herein, data network(s) 110 and 122, network access servers 112 and content servers 124 are each intended to represent such data network(s) and servers commonly known in the art. In this regard, data network 110 is intended to represent any one or more of a publicly available, global data network (e.g., the Internet), a local area network (LAN), wide area network (WAN), metropolitan area network (MAN), and the like. While network 110 and network 122 are depicted as separate entities to denote that the tunnel can be established though a network other than the Internet, such networks 110 and 122 may well be combined in alternate implementations (i.e., where the data network 110 is Internet). Content servers 124 are intended to represent any computing system coupled to and accessible through a data network (e.g., 110, 122) which provides content (perhaps selectively) to requesting users through such communicatively coupled data network(s). In this regard, content server(s) 122 may well host one or more of audio content, video content, other visual content, textual content, data services, application services, and/or multimedia services.

As used herein, end-user device(s) (EUD) 102 are intended to represent any of a wide variety of computing appliances which require an end-user terminal (e.g., 104) to interface with data network 110. In accordance with the illustrated embodiment, the EUD are intended to represent traditional computing systems (e.g., desktop computer, laptop computer, etc.) as well as non-traditional computing appliances (e.g., Internet television/video appliance, Internet stereo appliance, etc.). In accordance with the teachings of the present invention, EUDs 102 interface with the data network 110 through a wireless communication subsystem and, as such, require a wireless interface to the wireless communication subsystem through which communication with data network 110 is facilitated. Accordingly, EUDs 102 interface with the wireless communication subsystem through the modulation/demodulation (modem) resources of a wireless end-user terminal 104 (e.g., a wireless modem). It is to be appreciated, however, that certain computing devices incorporate wireless communication capability such as, for example, wireless communication handset 118, and/or palmtop computing devices with integrated wireless modem facilities 120. For ease of explanation, unless a specific reference to a particular device is intended, all such wireless enabled computing devices, e.g., end-user terminal 104, telephony subscriber unit 118 and wireless PDA 120 will hereafter be cumulatively referred to as subscriber unit(s) 104, 118, 120.

As introduced above, end-user terminal (EUT) 104 provides the wireless communication interface to the wireless communication system component of network 100 for those end-user appliances (e.g., 102) without integrated wireless communication facilities. According to one aspect of the present invention to be developed more fully below, end-user terminal 104 includes an innovative communications agent, not shown, which enables the end-user terminal 104 to establish and effectively manage multiple, simultaneous wireless communication sessions on behalf of one or more end-user devices 102. That is, unlike conventional wireless modems which merely support one wireless communication session, end-user terminal 104 includes a communications agent which facilitates multiple simultaneous wireless communication sessions, thus being able to service multiple EUDs 102, as depicted. In accordance with this aspect of the present invention, the communications agent includes a communication session identification generator (CSIG) selectively invoked to generate a unique communication session identifier (session_ID) to manage the multiple communication sessions. But for the addition of the communications agent, end-user terminal 104 is intended to represent any of a wide range of wireless communication system modems known in the art.

Basestation 106 in conjunction with end-user terminal 104 and wireless enabled computing appliances 118 and 120 (i.e., subscriber units 104, 118 and 120) comprise at least a subset of a wireless communication network. As used herein, the wireless communication system may well employ any one or more of a number of wireless communication technologies known in the art such as, for example, time-division multiple access (TDMA), code-division multiple access (CDMA), frequency division multiple access (FDMA) and the like in accordance with any of a number of wireless communication system architectures such as, for example, wireless local loop (WLL) systems, digital and/or analog mobile cellular systems, personal handy phone (PHP) systems, and the like.

As used herein, basestation 106 selectively provides wireless communication channel resources to, for example, subscriber units 104, 118, 120 and other communication devices within the basestation's coverage area to facilitate delivery of communication and/or enhanced data services to such devices. Those skilled in the art will appreciate that basestation 106 provides an interface for such wireless devices to interface with other network resources such as, for example, content server(s) 124 via network access server 116, data network 110 and tunnel switch 108. In this regard, basestation 106 provides the interface between the end-user devices 102, 118, 120 and the network access server 116 through tunnel switch 108.

According to one example implementation, basestation 106 is populated with an innovative communications agent (not shown), which includes enhanced point-to-point protocol (EPPP) communication resources. That is, the communications agent includes an extension to the traditional point-to-point protocol (PPP) to facilitate the exchange of mobility information with tunnel switch 108. According to one implementation, to be developed more fully below, the EPPP is defined as an extension of one or more attribute-value pairs (AVP) to the L2TP extension of the PPP, introduced above.

In addition to the EPPP resources, the communications agent resident in basestation 106 may well include advanced security features such as, for example, authentication features, which facilitate secure mobility of wireless Internet sessions. It is to be appreciated that, while presented within the context of an innovative communications agent described more fully below, mobility management resources such as, for example, the EPPP resources and the security features, may well be introduced to the basestation 106 in means other than the communications agent described herein. In one implementation, for example, the EPPP resources are integrated within an updated release of the L2TP communication stack. Regardless of such implementation details, a basestation endowed with EPPP capability (e.g., 106) introduce mobility management features in a data network communication session to facilitate delivery of enhanced data services to mobile computing devices unencumbered by the limitations inherent in the conventional solutions introduced above.

As used herein, tunnel switch 108 provides access to enhanced data services through a network access server 112 for end-user device(s) 102, 118, 120 serviced by basestation 106. Although depicted servicing but one basestation 106, those skilled in the art will appreciate that this is for ease of explanation only, and that tunnel switch 108 may well enable enhanced data services for any of a number of basestations. But for the teachings of the present invention, introduced below, tunnel switch 108 is intended to represent any of a number of computing appliances typically used to access the features and services of a data network such as, for example, data network 110.

In accordance with one aspect of the present invention, tunnel switch 108 is endowed with EPPP communication services and security features (e.g., in the form of a communications agent) to facilitate the exchange of mobility information with wireless communication system component(s) (e.g., basestation 106). Moreover, tunnel switch 108 may well be used as an access point for end-user devices coupled to tunnel switch 108 via traditional, wired networks (e.g., plain old telephone system (POTS), etc.) as well.

In accordance with the foregoing, FIG. 1 is intended to generally illustrate the network elements involved in providing a mobile, end-user device 102, 118 and 120 with enhanced data services from, e.g., content servers 124 via data network 110, 122. In accordance with the teachings of the present invention, to be developed more fully below, one or more elements of data network 100 include an enhanced point-to-point protocol (EPPP) stack, which facilitates mobility management within the data networking communication session. While FIG. 1 provides the architectural elements of the network, attention is drawn to FIG. 2, which provides representation of the communication between such elements.

Figure 2:
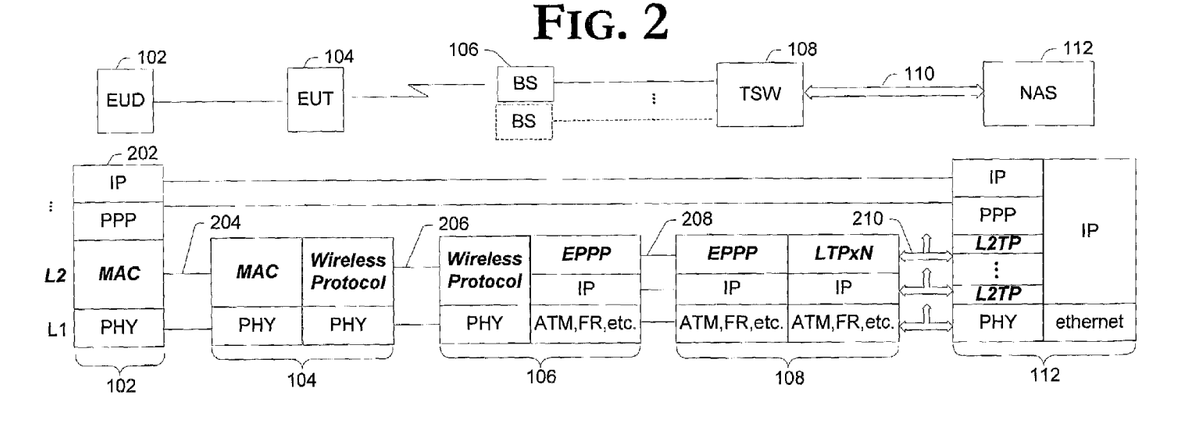
FIG. 2 is graphical illustration of the communication layers utilized between network elements facilitating the enhanced data services, in accordance with the teachings of the present invention.

Turning to FIG. 2, a graphical illustration of the communication between the respective elements of network 100 required to provide, e.g., EUD 102 with enhanced data services is presented, in accordance with the teachings of the present invention. More particularly, FIG. 2 graphically illustrates a communication session between the EUD 102 and the content server 112 utilizing the well-known Open Systems Interconnection (OSI) seven-layer communication model. In this regard, the OSI stack 202 at the EUD 102 includes at least the physical layer connection (layer 1), the media access control layer (layer 2), and the network (PPP) and transport (IP) layers, e.g., layer 3 and layer 4. The EUD 102 is communicatively coupled to the EUT 106 via the physical layer (layer 1) and the MAC layer 204, as shown. The EUT 104 is depicted coupled to the basestation 106 through a wireless physical layer connection and a wireless protocol 206 appropriate to the particular architecture of the wireless communication subsystem.

Basestation 106 is depicted coupled to tunnel switch 108 at the physical layer utilizing any of a number of well-known networking architectures such as, for example, Asynchronous Transfer Mode (ATM), Frame Relay (FR), etc. In accordance with the teachings of the present invention, introduced above, basestation 106 and tunnel switch 108 invoke an enhanced point-to-point (EPPP) communication protocol 208 to manage the communication session between the two elements. More particularly, in accordance with one aspect of the present invention, the EPPP communication protocol includes one or more control commands characterized by attribute-value pairs (AVP) to facilitate the exchange of mobility information between the elements 106, 108.

From the tunnel switch 108 to the network access servers 112, L2TP is utilized to establish secure communication session(s) on behalf of one or more EUDs 102, 118, 120. It will be appreciated, from the discussion to follow, that unlike conventional techniques for providing data services to wireless computing appliances, utilization of the EPPP between the basestation 106 and the tunnel switch 108 enables the one or more of such elements to dynamically establish, manage, and tear-down communication session(s) with appropriate wireless network elements (e.g., basestations) serving a mobile client. Introducing such mobility information effectively reduces the number of zombie sessions created, and facilitates accurate delivery of requested information to the requesting, mobile client.

Example Implementation(s) of the Communications Agent

Figure 3:
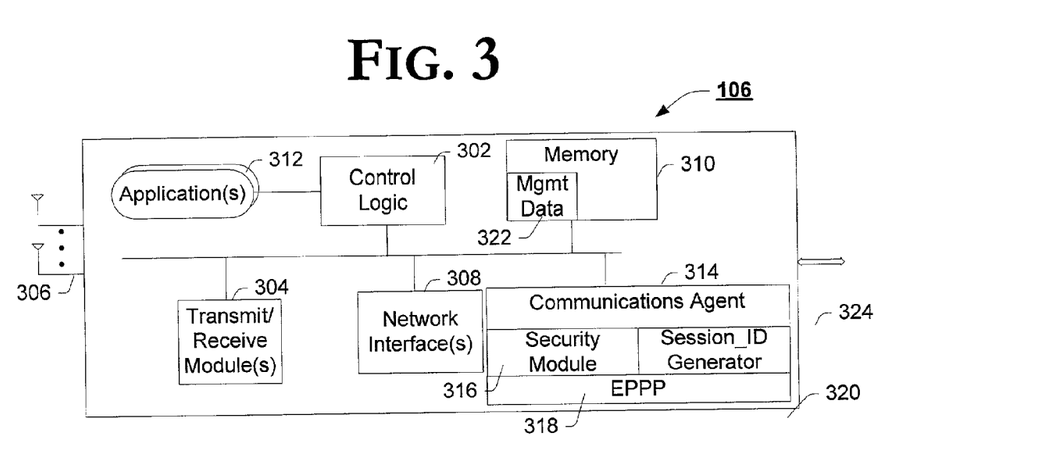
FIG. 3 is a block diagram of a basestation incorporating the teachings of the present invention.
Figure 4:
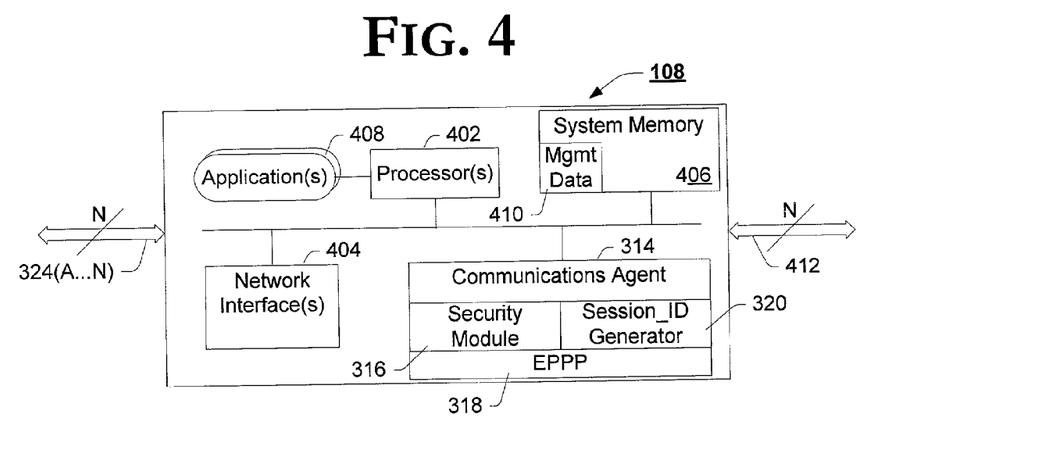
FIG. 4 is a block diagram of an example network access server incorporating the teachings of the present invention.
Figure 5:
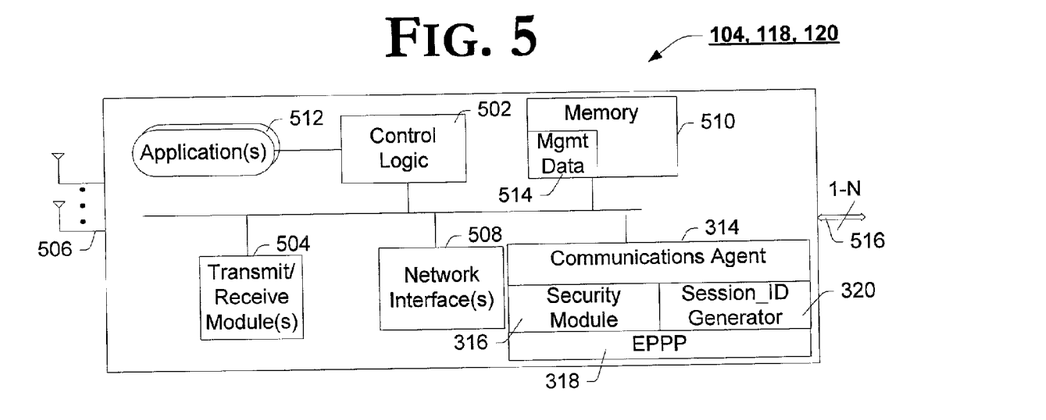
FIG. 5 is a block diagram of an example subscriber unit incorporating the teachings of the present invention.

Having introduced the architectural and communication operating environment of the present invention with respect to FIGS. 1 and 2, above, reference is next directed to FIGS. 3, 4 and 5 which illustrate a block diagram of various PPP communication session elements incorporating aspects of the present invention, according to one example implementation. More particularly, in accordance with one embodiment, FIGS. 3-5 illustrate an example basestation 106, tunnel switch 108, and a subscriber unit 104, 118, 120 incorporating at least a subset of an innovative communications agent to facilitate mobile PPP communication sessions using such endowed network elements.

With reference to FIG. 3 a simplified block diagram of an example basestation incorporating the teachings of the present invention is depicted, in accordance with one example embodiment of the present invention. As introduced above, the basestation 106 is an element of the wireless communication subsystem which provides a wireless communication channel to one or more wireless-enabled computing devices 104, 118, 120 to interface such devices with other computing/communication device(s) (e.g., 112) within or external to the wireless communication subsystem. To facilitate such wireless communication services, basestation 106 is depicted comprising control logic 302, wireless communication facilities such as, for example, transmit/receive module(s) 304 and one or more antenna(e) 306, network interface(s) 308, memory 310 and, optionally, one or more applications. In addition, basestation 106 is depicted comprising an innovative communications agent 314 to facilitate the exchange of mobility information with other network elements, e.g., tunnel switch 108, in accordance with one aspect of the present invention. But for the innovative communications agent 314, basestation 106 and, more specifically, elements 302-312, are intended to represent those wireless basestation(s) and basestation components commonly known in the art.

In accordance with the illustrated example embodiment, communications agent 314 is depicted comprising security module 316, an enhanced point-to-point communications protocol 318 and a session identification generator 320. Although depicted comprising three (3) functional elements 316-320, those skilled in the art will appreciate that in alternate embodiments, communications agent 314 may well be practiced with any one or more of such elements without deviating from the spirit and scope of the present invention. Moreover, although depicted residing within a basestation, it should be appreciated that other network elements, e.g., end-user terminal 104 or tunnel switch 108, may well benefit from one or more aspects of communications agent 314. In this regard, communications agents of greater or lesser complexity, integrated within any of a number of wired or wireless network elements, to facilitate a mobile PPP communication session, or to facilitate multiple wireless communication sessions by a single end-user terminal, is anticipated by the present invention.

As used herein, security module 316 facilitates secure EPPP communication between one or more elements involved in a communication session (i.e., any or all parts of the PPP session established between a subscriber unit (104, 118, 120) and a tunnel switch (108)). According to one example implementation, security module 316 selectively invokes an authentication feature which updates public and/or private keys used to authenticate the basestation and network access server to one another, ensuring secure communications between such PPP communication participants. In addition, security module 316 may well be invoked by communications agent 314 to authenticate communication session identifiers when a handoff of an existing communication session is attempted by a subscriber unit (104, 118, 120).

Enhanced PPP module 318 includes, in part, a mobility extension to the conventional PPP to facilitate the exchange of mobility information between elements of the PPP communication session (subscriber unit 104 through tunnel switch 108). According to one example implementation, EPPP is a mobility extension to the conventional L2TP communications protocol, the extension comprising one or more of five (5) new attribute-value pair (AVP) combinations used in conjunction with existing L2TP control commands. In general, the EPPP include one or more of the following five new AVPs:

(callType, callTypeValue): where callTypeValue denotes one or more of at least "newCall" or "handover";

(COOKIE, cookieValue): where cookieValue is a communication session identifier uniquely identifying the communication session;

(K_n, <nBits,theBits>): where K_n denotes a random number generated by the tunnel switch 108 and used in combination with cookieValue to uniquely identify the communication session. According to one implementation, K_n is generated by security module 316 (resident within tunnel switch 108) and known only to the subscriber unit (104, 118, 120) and the tunnel switch 108;

(authentication, authenticationValue): where authenticationValue comprises an appropriate one or more of challenge, challengeResponse, authFail values; and (CS-CERT, CertValue): where CertValue includes an appropriate one or more of a public key, private key, basestation identifier, and the like.

Each of the foregoing AVPs will be described more fully below in the context of their use to facilitate certain aspects of the invention.

In addition to the foregoing, communications agent 314 is depicted comprising communication session identification generator 320. In accordance with one aspect of the present invention, session identification generator 320 may well be invoked a communication session identifier (ID) to uniquely identify each of the communication sessions currently active. According to one example implementation, a communications agent 314 within a subscriber unit is responsible for generating a session_ID for new communication sessions. In alternate implementations, however, communications agents within the basestation or tunnel switch may well be used to generate the session identifier.

According to one example implementation, communication session identification generator 320 generates a two-part identifier comprising a deterministic element and a random element, mathematically represented according to equation 1:

$$ID = (\text{Deterministic, Random}) \quad (1)$$

In accordance with the example implementation, the deterministic element is communicated using the COOKIE AVP, while the random element is communicated using the K_n AVP.

According to one implementation, the deterministic element of the identifier generated by session_ID generator 320 is a function of one or more of a subscriber unit identifier (e.g., an electronic serial number (ESN), a media access controller (MAC) address, subscriber unit telephone number, and the like), an end-user device identifier (MAC address, hardware serial number, etc.), a user-session identifier (e.g., user name, session task identifier, etc.) and/or a non-volatile random number, or a combination thereof. In this regard, the deterministic element may well be indicative of the subscriber unit identity. The function employed by session_ID generator 320 to generate the deterministic element depends on the particular application of the accessing subscriber unit 104, 118, 120. If, for example, the accessing subscriber unit merely supports one end-user device and a single user, session identification generator 316 may well employ a function according to equation 2:

$$D = f(\text{subscriber\_unit\_identifier}) \quad (2)$$

If, however, the single end-user device supports multiple simultaneous users, a function according to equation 3, below, may well be employed to generate the deterministic element of session_ID:

$$D = f((\text{subscriber\_unit\_identifier})(\text{user\_ID})) \quad (3)$$

According to one aspect of the present invention, an end-user terminal 104 incorporating the communications agent 314 may well support multiple simultaneous communication sessions on behalf of one or more end-user devices 102. To facilitate such multiple, simultaneous wireless communication sessions using a single end-user terminal 104, session_ID generator 320 selectively invokes a function denoting the end-user device as well as the subscriber unit and, perhaps, the user(s) according to equation 4, below:

$$D = f(\text{subscriber\_unit\_identifier})(\text{end\_user\_deviceID})(\text{user\_ID}) \quad (4)$$

According to one implementation, the function employed merely concatenates the one or more identifiers, while in alternate implementations, a hash function may well be used.

Session ID generator 320 may well employ any of a number of methods to generate the random element of the session identifier. According to one implementation, for example, session ID generator 320 utilizes one or more of a pseudo-random number generator, a function of radio-frequency thermal noise, and the like. The random element of the identifier may well be generated with any algorithm that is secure by being unpredictable to an observer.

According to one implementation, the innovative communications agent 314 is implemented in hardware using, for example, an Application Specific Integrated Circuit (ASIC), a special purpose processor, a microcontroller, a field programmable gate array (FPGA), programmable logic device (PLD), and the like. In alternate implementations, one or more of the innovative aspects of communications agent 314 may well be embodied in a series of executable instructions which, when executed by an accessing computing device, selectively invoke an instance of the communications agent 314. In accordance with this alternate implementation, the series of software instructions to implement communications agent 314 may well be stored in an accessible storage device (e.g., volatile or non-volatile storage medium), or in a transmission medium (e.g., while traversing a wired or wireless network). Accordingly, those skilled in the art will appreciate that communications agent 314 may well be implemented in any of a number of alternate means without deviating from the spirit and scope of the present invention.

In FIG. 4 an example tunnel switch 108 incorporating the teachings of the present invention is depicted. As introduced above, tunnel switch 108 provides an entry point for clients (wired and/or wireless) to a data network. In accordance with the illustrated example implementation of FIG. 4, tunnel switch 108 is depicted comprising processor(s) 402, network interface(s) 404, system memory 406 and one or more applications, each coupled as depicted. In addition, tunnel switch 108 is depicted comprising the innovative communications agent 314, to selectively implement one or more aspects of the present invention, introduced above. As used herein, but for introduction of the communications agent 314, tunnel switch 108 is intended to represent any of a number of such devices known in the art. In this regard, tunnel switch 108 may well be a network switching device, an access server, and the like endowed with the innovative communications agent 314 to facilitate the exchange of mobility information with other network elements.

Turning to FIG. 5, a block diagram of an example end-user terminal incorporating the teachings of the present invention is presented. According to one implementation, the end-user terminal of FIG. 5 represents any one or more a wireless modem 104, a wireless communication handset 118, or a wireless enabled computing device 120 (cumulatively, subscriber units). In accordance with the illustrated embodiment of FIG. 5, the end-user terminal (104, 118, 120) is presented comprising control logic 502, a wireless communications interface including transmit/receive module(s) 504 and antenna(e) 506, network interface(s) 508, memory 510 and one or more application(s) 512. In addition to the conventional elements of a wireless communication subscriber unit introduced above, the end-user terminal illustrated in FIG. 5 is endowed with the innovative communications agent 314, introduced above. According to one embodiment, communications agent 314 implemented within subscriber unit 104, 118, 120 is merely comprised of session_ID generator 316 and security module 320. In accordance with one implementation, session_ID generator 316 of the subscriber unit is responsible for generating new session_ID's within the system, while security module 320 periodically verifies authentication certificates provided by interfacing basestation(s) 106. But for the introduction of communications agent 314, subscriber unit 104, 118, 120 is intended to represent any of a number of such devices known in the art.

While communications agent 314 is depicted in FIGS. 3-5 as comprising each of the security module 316, EPPP module 318 and session_ID generator 320, those skilled in the art will appreciate that different applications may not require all of such elements to implement the teachings of the present invention. In one implementation, for example, implementation of the communications agent 314 within a subscriber unit (e.g., 104, 118, 120) may only include the session_ID generator 320. Implementation within a basestation (e.g., 106) may only include security module 316 and the EPPP module 318. Accordingly, such alternate implementations are anticipated within the scope and spirit of the present invention.

Example Data Structure(s)

As illustrated example implementation of FIGS. 3-5, each of the network elements depicted therein include a segment of memory devoted to mobility management data structure (s). In accordance with the illustrated example implementation(s), the mobility management data structures reside within the system memory (e.g., 310, 406, 510) of the respective network element. In alternate implementations, not shown, such mobility management data structure(s) (322, 410, 514, respectively) may well be implemented as level-one (L1) cache resident on a host processor (e.g., 302, 402, 502). Alternatively, such data structures may well reside within memory (not depicted) integrated within communications agent 314.

Figure 6A:
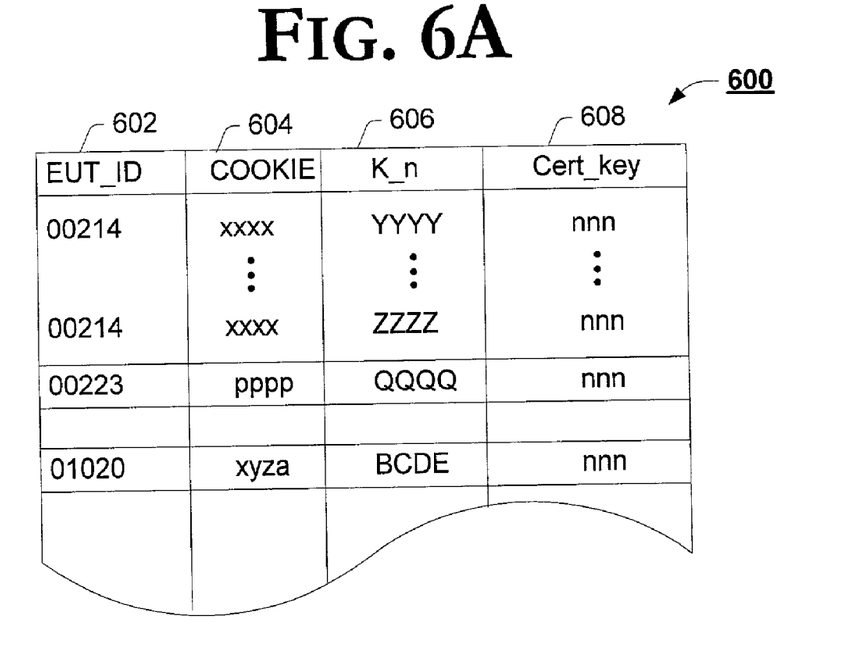
FIGS. 6A and 6B illustrate graphical representations of example data structures used to facilitate mobility management within the data network of FIG. 1.

As used herein, the size and complexity of the data structure(s) used to implement the aforementioned mobility management features of communications agent 314 depend on the network element in which the agent is deployed. Accordingly, by way of example and for purposes of illustration only, two example mobility management data structures are depicted with reference to FIGS. 6A and 6B. More particularly, it will be appreciated that the data structure 600 illustrated in FIG. 6A is well-suited to implementation within a subscriber unit 104, 118, 120 and a tunnel switch 108, while the data structure of FIG. 6B may well be implemented within a basestation 106. It should be appreciated, however, that FIGS. 6A and 6B provide a mere example of suitable data structures and that data structures of greater or lesser complexity may well be used without deviating from the spirit and scope of the present invention.

FIG. 6A graphically illustrates an example mobility management data structure suitable for use in one or more of the network elements in accordance with the teachings of the present invention. In accordance with the illustrated example implementation of FIG. 6A, data structure 600 is depicted comprising an end-user terminal identifier field 602, a COOKIE field 604, a random number K_n field 606 and a certification_key field 608. As introduced above, one or more of such fields may well be used to generate a session identifier used by such network elements to uniquely identify individual communication sessions. In certain implementations, for purposes of implementation of security features introduced above, it is important that the subscriber unit 104, 118 and 120 and the tunnel switch 108 retain individual elements of the session_ID generated in accordance with one or more of the functions described above for purposes of authentication during a handoff and to facilitate zombie session clean-up. Thus, use of a more complex data structure such as that depicted in FIG. 6A is well suited to maintain these individual elements of the generated session ID. Alternatively, such network appliances (104, 108, 118, 120) may well use a simpler data structure (see, e.g., 620 below) and recover the necessary information by reversing the function(s) applied to create the session_ID.

As used herein, EUT_ID field 602 is used to store end-user terminal (subscriber unit) identifiers. As introduced above, such identifiers may well include electronic serial numbers (ESN) of the device, a media access control (MAC) address associated with the device, or any of a number of alphanumeric codes uniquely assigned to the end-user terminal 104, 118, 120. The COOKIE and K_n fields 604 and 606, maintain the deterministic and random elements, respectively of the session_ID generated by session_ID generator 320, as introduced above. The certification_key field 608 maintains the current certification_key obtained and used by the security module 316 to facilitate the authentication features introduced above.

Figure 6B:
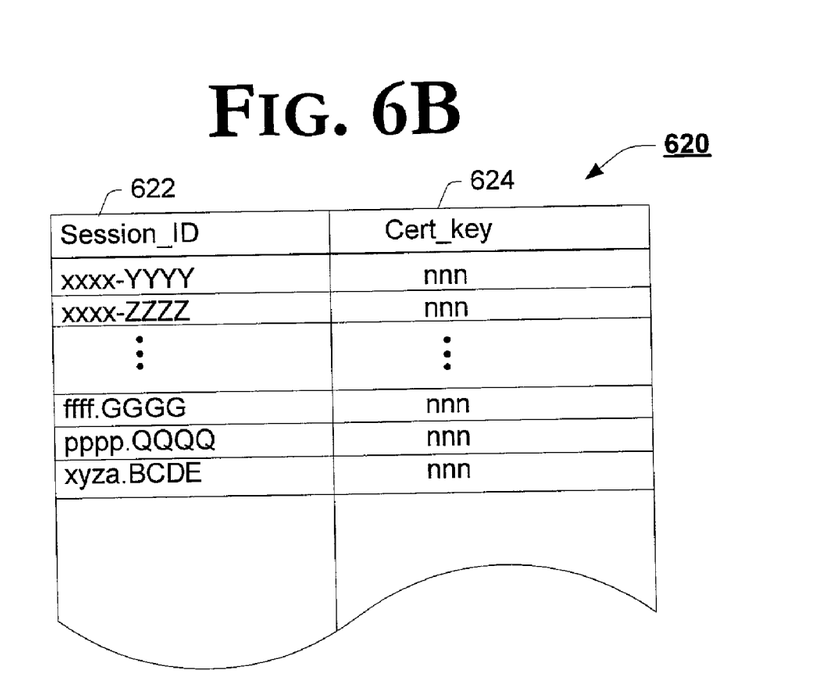

FIG. 6B graphically illustrates another mobility management data structure suitable for use within one or more network elements incorporating the teachings of the present invention. In accordance with the illustrated example implementation of FIG. 6B, data structure 620 is depicted comprising a session_ID field 622 and a certification_key field 624. As used herein, the session_ID field 622 maintains a list of session_ID's associated with active communication sessions generated in accordance with one or more of the functions described above. As above, the cert_key field 624 is populated with one or more certificates obtained and used by security module 316 to authenticate communications between, for example, the basestation and the network access server.

Example Implementation and Operation

Having introduced the operational and architectural elements of the present invention, above, reference is next directed to FIGS. 7-10, wherein certain aspects of the present invention are developed in greater detail.

Figure 7:
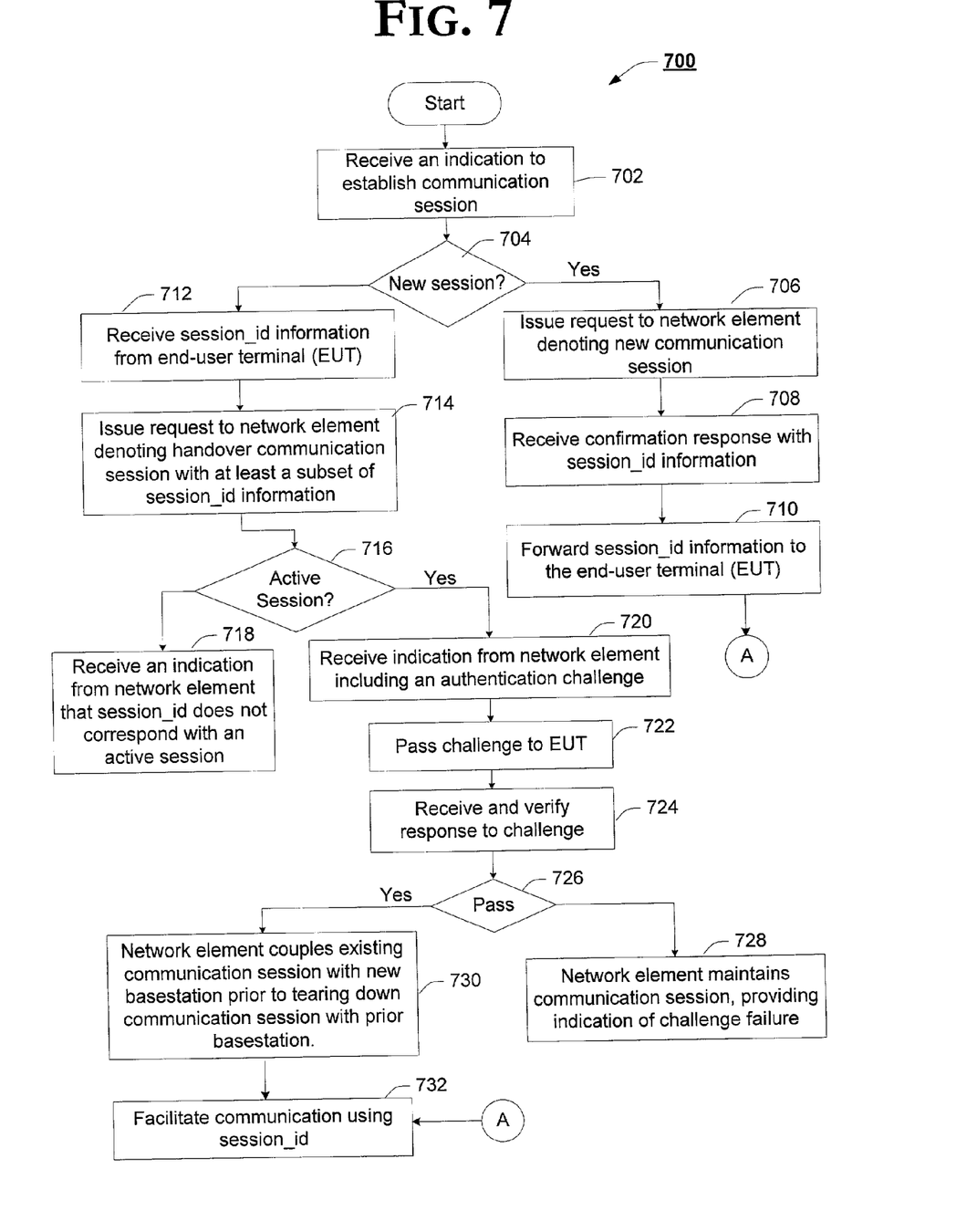
FIG. 7 is a flow chart of an example method for managing wireless access to data network resources, in accordance with the teachings of the present invention.

FIG. 7 illustrates a flow chart of an example method for establishing and managing delivery of enhanced data services in a wireless networking environment, according to one aspect of the present invention. As shown, the method of FIG. 7 begins with block 702 wherein basestation 106 receives an indication to establish a communication session to/from a subscriber unit. In block 704, communications agent 104 makes a determination of whether the request is for a new communication session, or to facilitate handoff from another basestation of an existing communication session. In accordance with the teachings of the present invention, introduced above, communications agent 314 makes such determination by analyzing the content of access request and determining whether a session_ID is present within the access request.

Establishing a New Communication Session

If, in block 704, communications agent 314 of basestation 106 fails to identify a session_ID, thereby denoting request for new communication session, the process continues with block 706 wherein the communications agent 314 of basestation 106 issues a request to an tunnel switch 108 requesting a new communication session. In accordance with one example implementation, basestation 106 selectively invokes an instance of session_ID generator 316 to dynamically generate a communication session identifier. In such an implementation, the request issued to the network access point would also include one or more of the (COOKIE,cookieValue) AVP and the (K_n, <nBits,theBits>) AVP denoting the newly generated session identifier. In accordance with an alternate embodiment, communications agent 314 of the basestation 106 merely issues a call request to the tunnel switch 108 including the (callType, newCall) AVP, whereupon the session_ID generator 316 of the tunnel switch 108 generates the communication session ID.

In an alternate implementation, session_ID generator 316 of the subscriber unit 104, 118, 120 generates the session_ID, whereupon the communications agent 314 of the basestation determines whether the access request includes an active session ID. According to one implementation, the determination is made by accessing data management information within basestation 106 and, if the session_ID is not found, the basestation 106 issues the ICRQ with the newCall AVP.

Tunnel switch 108 including at least the EPPP module 318 receives and interprets the call request including the new callType AVP and, if bandwidth is available to support the new communication session, issues a call response control command including the session_ID information (generated locally, or provided by the basestation 106 from the subscriber unit in the initial call request), block 708. This communication session ID will follow the communication session as it traverses (i.e., through handoffs) the mobile client's access through any of a number of basestations supported by the tunnel switch 108.

In block 710, basestation 106 receives and interprets the call response control command from tunnel switch 108, and issues a Reply control command to the subscriber unit (104, 118, 120) with the session_ID information. According to one implementation, the Reply control command includes the deterministic COOKIE element as well as the random K_n element. The subscriber unit 104, 118 or 120 stores the communication session identifier in management data 510 for use in subsequent communications with basestation(s) and tunnel switch 108.

Once established in this fashion, basestation 106 and tunnel switch 108 support the communication session on behalf of the accessing subscriber unit until call tear-down, i.e., at the end of the communication session, or upon handing-off the communication session to another basestation, block 732.

Figure 8:
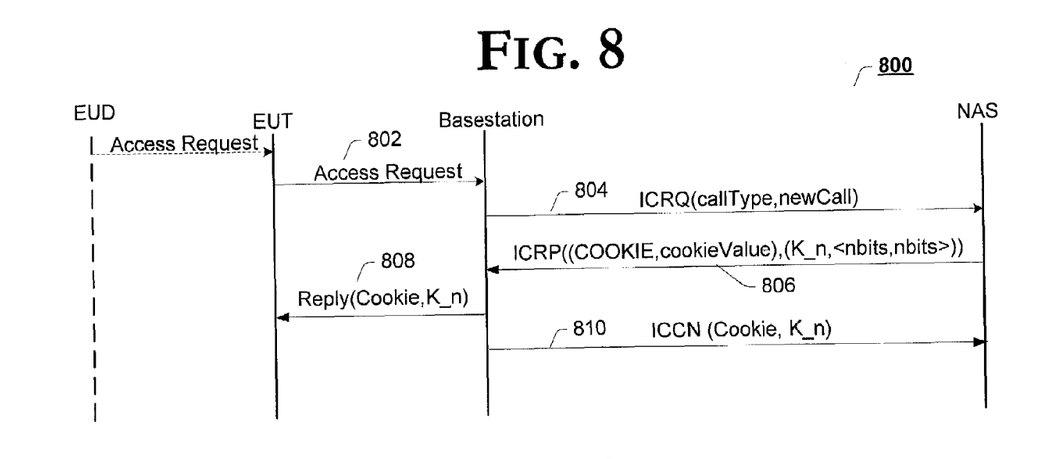
FIG. 8 is a communication flow diagram for establishing a new communication session, in accordance with the teachings of the present invention.

Turning briefly to FIG. 8, a communication flow diagram of the method steps 702-710 for establishing a new communication session is depicted, in accordance with the teachings of the present invention. In accordance with the illustrated example implementation of FIG. 8, a subscriber unit (104, 118, 120) issues an access request 802 to a basestation 106 to establish a communication session. According to one implementation, the access request includes the session_ID generated by the subscriber unit. As shown, this access request could have been initiated by an end-user device 102, and forwarded to basestation 106 by a subscriber unit 104 as the wireless communication system interface for the EUD 102.

Upon receiving the access request 802, the basestation 106 determines whether the incoming call request represents a new call or a handoff of a pre-existing communication session. If, as here, the access request does not include a session_ID, or the basestation 106 fails to recognize a provided session_ID, basestation 106 issues a incoming call request (ICRQ) control command including at least the new callType AVP denoting that the request is for a newCall, i.e., ICRQ (callType,newCall) 804.

In response, if available bandwidth exists, tunnel switch 108 issues an incoming call response control command (ICRP) including at least the COOKIE and the K_n AVP's denoting the deterministic and the random elements of the newly generated session_ID, i.e., ICRP (COOKIE,cookieValue),(K_n,<nBits,theBits>) 806.

Basestation 106 receives the call reply control command and issues an access reply (Reply) control command including the session_ID (Cookie,K_n) associated with the new communication session. It should be noted that each of the appropriate subscriber unit (e.g., 104, 118 or 120), basestation 106, and tunnel switch 108 utilize a data structure (e.g., 600, 620) to maintain a listing of at least active communication sessions currently supported by the respective network element.

Once established, any communication to/from network elements associated with the communication session will include reference to the particular communication session_ID associated with the particular communication session.

Example Communication Session Handoff

Returning to block 704 of the flow chart illustrated in FIG. 7, if basestation 106 identifies a session_ID in the access request, communications agent 314 determines that the access request is associated with a pre-existing communication session, block 712. In response, basestation 106 issues a request to the tunnel switch 108 denoting the receipt of a request for handover (or handoff from one basestation to another) of a communication session, block 714. That is, as the subscriber unit moves from the coverage area of one basestation into the coverage area of second basestation, the receive signal strength from the second basestation will reach a threshold whereupon the subscriber unit determines that communication via the second basestation would (potentially) provide better communication conditions. In this case, the subscriber unit will request a handoff of the communication session from the first basestation to the second basestation.

In accordance with the teachings of the present invention, the newly requested (i.e., the second) basestation 106 issues an incoming call request control command (ICRQ) comprising at least the (callType, handover) AVP and the (COOKIE,cookieValue) AVP.

In block 716, the tunnel switch 108 makes a determination of whether the incoming call request accurately denotes an existing communication session. According to one implementation, security module 316 of tunnel switch 108 receives the COOKIE AVP and traverses the contents of management data structure 410 (e.g., data structure 600) to find a match of the cookieValue. If no match is identified, tunnel switch 108 issues a incoming call response control command denoting that the communication session failed to authenticate, block 718. More particularly, in accordance with the teachings of the present invention, tunnel switch 108 issues an ICRP control command with the (authentication,authFail) AVP. An indication that the call request failed is subsequently issued to the subscriber unit, upon receipt of the negative authentication AVP.

If, in block 716, tunnel switch 108 does recognize the cookieValue as being associated with an active communication session, tunnel switch 108 issues an incoming call response control command (ICRP) with the (authentication, challenge) AVP, which is received by basestation 106 in block 720. In block 722 the basestation issues a Reply control command to the subscriber unit with the authentication challenge in block 722.

In response to the challenge, the subscriber unit supplies a Response including a function of the random number element (K_n) of the session ID. Recall that in one example implementation, the random number element is known only to the subscriber unit (104, 118, or 120) and the tunnel switch 108. Accordingly, this functional response issued by the subscriber unit is passed to the tunnel switch 108 in an incoming call connect control command (ICCN) including at least the (authentication,challengeResponse) AVP, wherein the challengeResponse includes at least the function of the random element (K_n), block 724.

In block 726, tunnel switch 108 analyzes the content of the challengeResponse, e.g., performs an inverse of the function the subscriber unit applied to the random element, to authenticate the identity of the requesting subscriber. If the decrypted challengeResponse fails, tunnel switch 108 issues an incoming call response control command (ICRP) with at least the (authentication,authFail) AVP, and the handover attempt fails, block 728. According to one implementation, an indication of the failed handoff is provided to the subscriber unit, which continues to communicate with tunnel switch 108 through the existing communication session.

If, in block 726, the identity of the requesting subscriber unit is verified the process continues with block 718 wherein tunnel switch 108 updates management data information associated with the communication session to denote the new basestation supporting the requesting client prior to tearing down any existing connection between the handoff basestation and the subscriber unit, block 730. Once the communication session parameters are updated in the tunnel switch 108 and the appropriate subscriber unit (104, 118, 120), any pending or future communication from the network access server to the subscriber unit and vice versa is performed via the new basestation.

Once the new communication session parameters are in place, denoting the new basestation as the communication path between the subscriber unit and the TSW 108, TSW 108 initiates a disconnection of the "old" subscriber unit to basestation communication path. Accordingly, those skilled in the art will appreciate from the foregoing that use of the newly introduced AVP's facilitate mobility management and reduces or eliminates the potential for the inadvertent generation of zombie sessions.

Figure 9:
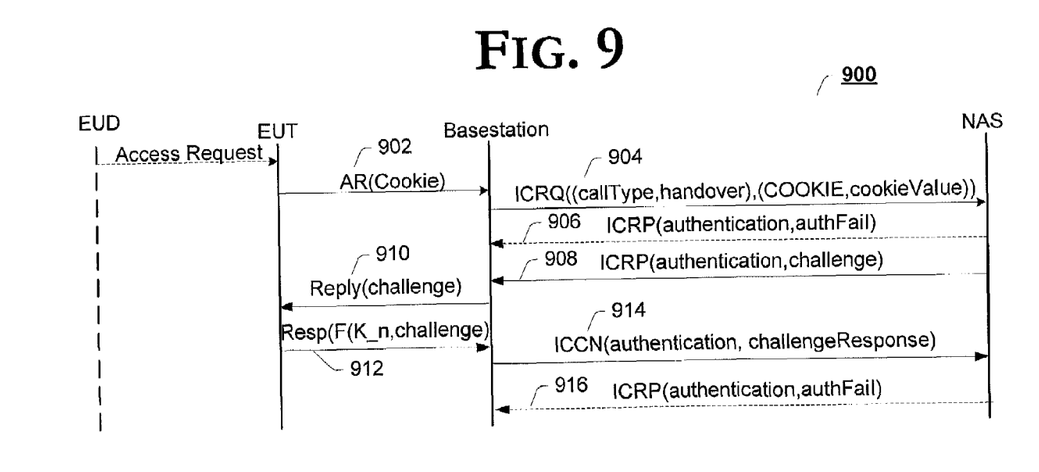
FIG. 9 is a communication flow diagram facilitating handoff of a wireless data communication session from one basestation to another, in accordance with the teachings of the present invention.

Turning briefly to FIG. 9, an example communication flow diagram is presented to illustrate the network communications involved in a handover, according to the teachings of the present invention. As shown, the handover call request is distinguished from the new call request in that the initial request from the subscriber unit includes the deterministic element of the session_ID, i.e., the Cookie, 902. In response, the basestation issues an ICRQ including at least the (callType,handover) AVP and the (COOKIE,cookieValue) AVP, 904.

The tunnel switch 108 receives the ICRQ and invokes an instance of security module 316 to authenticate the received cookieValue. If the received cookieValue cannot be authenticated, tunnel switch 108 issues an ICRP with the (authentication,authFail) AVP, 906. If, however, the cookieValue is authenticated, further authentication is protect against replay attacks by an undesirable user. That is, an ICRP is issued with at least the (authentication,challenge) AVP, 908, which is received and forwarded to the requesting subscriber unit 910.

In response to this authentication challenge, the subscriber unit encrypts (e.g., using a hash function, etc.) the random element of the session_ID, known only to the appropriate subscriber unit and tunnel switch associated with the communication session denoted by the cookieValue, and embeds this function of the random element (K_n) in the response to the tunnel switch Resp(F(K_n, challenge)) 912. This function of the random element of the session_ID is passed from the basestation 106 to the tunnel switch 108 in a ICCN control command using at least the (authentication,challengeResponse), where challengeResponse includes at least a subset of the hashed function of the random element (K_n) of the session_ID, 914.

The tunnel switch receives the challenge response and decrypts it to authenticate the identity of the requesting subscriber unit 914. If the network access server fails to recover the random element of the session_ID through the decryption process, tunnel switch 108 issues an ICRP control command including at least the (authentication,authFail) AVP, 916.

Example Basestation Certification Process

As introduced above, to protect the integrity of the communication session, unique and secretive identifiers are used to denote subscriber unit (i.e., the deterministic cookieValue), to authenticate the subscriber unit's communication session (i.e., the random K_n value) as well as to authenticate the identity of a basestation to the subscriber unit. As introduced above, the basestation 106 includes a security module 316 that periodically updates a basestation certificate with a third-party certification agency to authenticate itself to subscriber units (e.g., 104, 118, 120). This basestation authentication is performed using the new (CS-CERT, certificateValue) AVP. According to one implementation, the certificates used by the basestation 106 updated periodically, e.g., daily, weekly, monthly etc. In alternate implementations, the certificates are not updated on periodic basis, but in accordance with some other refresh schedule (e.g., administrator initiated action, etc.). An example method for updating and exchanging authentication certificates is illustrated with reference to the communication flow diagram of FIG. 10.

Figure 10:
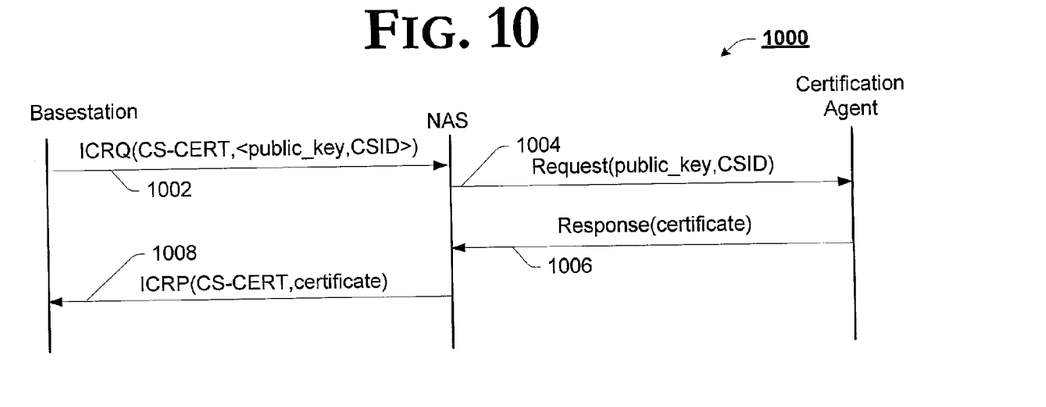
FIG. 10 is a communication flow diagram illustrating an example certification method to facilitate secure wireless data communication, in accordance with the teachings of the present invention.

Turning to FIG. 10 a communication flow diagram is presented which graphically illustrates a process through which the basestation updates the certificates used for authentication to subscriber units 104, 118, 120. As shown, the process begins when basestation 106 initiates an incoming call request control command (ICRQ) including at least the (CS-Cert,<public_key,CSID>) AVP to tunnel switch 108, 1002. According to one implementation, basestation 106 periodically invokes an instance of security module 316 to initiate updating of the basestation certificate. As used herein, the CSID is a basestation identifier such as, for example, a hardware serial number, a media access control (MAC) address, etc. The public key is issued to the basestation 106 by the certification agency. According to one element of the present invention, the public key, the CSID and the certificate are maintained in management data 322.

In response to the ICRQ received from the basestation, the tunnel switch 108 issues a request for a new basestation certificate from, for example, a third-party certification agent through a network access server 112. According to one implementation, tunnel switch 108 invokes an instance of security module 316 to issue the request including at least the public_key and CSID associated with the basestation, 1004.

In response, the third-party certification agent issues a Response including the new basestation certificate 1006 to the tunnel switch 108. The tunnel switch 108 updates its management data to reflect the new certificate associated with the basestation 106, and passes the new certificate to the basestation utilizing a incoming call response (ICRP) control command with the (CS-CERT,certificate) AVP.

Alternate Embodiment(s)

Figure 11:
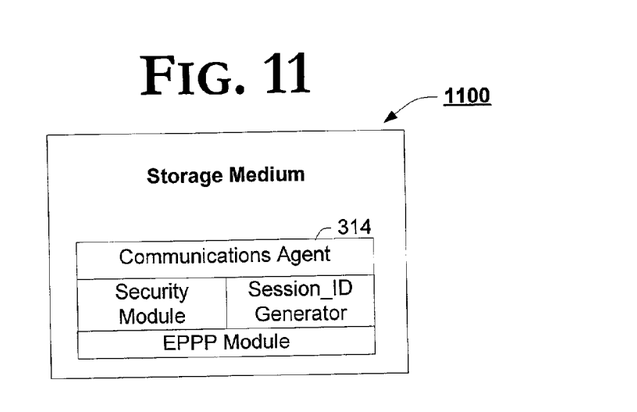
FIG. 11 is a block diagram of an example storage medium comprising a plurality of executable instructions which, when executed, cause an accessing machine to implement one or more aspects of the innovative communication agent of the present invention, in accordance with an alternate embodiment of the present invention.

FIG. 11 is a block diagram of an example storage medium comprising a plurality of executable instructions which, when executed, cause an accessing machine to implement one or more aspects of the innovative communication agent of the present invention, in accordance with an alternate embodiment of the present invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, any steps described as being performed by the base station may be performed by the user terminal and vice versa. The invention is equally applicable to systems in which terminals communicate with each other without either one being designated as a base station, a user terminal, a remote terminal or a subscriber station. The invention can further be applied to a network of peers.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets, it can be applied to a wide variety of different wireless systems in which data are exchanged. Such systems include voice, video, music, broadcast and other types of data systems without external connections. The present invention can be applied to fixed remote terminals as well as to low and high mobility terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
receiving a request to establish an end-to-end network communication session between a subscriber unit in a wireless communication system and a data network access server through a first basestation;
determining whether the received request is a request for a new session or a request to handoff an existing session from a second basestation wherein determining comprises analyzing attribute-value pair(s) (AVP) of the received request to identify a callType AVP and identifying the received request as a request for a new session if an identified callType AVP associated with the received request denotes a new call;
generating, if the received request is a request for a new session, a communication session identifier that follows the session and the subscriber unit as the subscriber unit moves from one basestation coverage area to another basestation coverage area;
authenticating, if the request is a request to handoff the existing session, an existing communication session identifier received with the request; and
wherein generating the communication session identifier further comprises:
composing a deterministic element of the communication session identifier;
composing a random element of the communication session identifier; and
employing a mathematical function to generate the communication session identifier using the deterministic element and the random element.

2. The method of claim 1, wherein the deterministic element is comprised of one or more of an electronic serial number (ESN) of the accessing subscriber unit, a media access control (MAC) address of the subscriber unit, and/or a telephone number associated with the subscriber unit.

3. The method of claim 1, wherein the random element is comprised of one or more of a pseudo-random number, and/or a true random number generated from radio frequency (RF) energy of thermal noise associated with the communication session.

4. The method of claim 1, wherein the mathematical function employed concatenates the deterministic element and the random element to generate the communication session identifier.

5. The method of claim 1, wherein the mathematical function employed generates a hash of the deterministic element and the random element to generate the communication session identifier.

6. An apparatus comprising:
a network interface to receive a request for an end-to-end network communication session between a wireless communication system subscriber unit and the apparatus through a first basestation;
a memory to store a communications agent to analyze attribute-value pair(s) (AVP) of a received incoming call request control command and identify, a callType AVP to determine whether the received request is a request for a new session or a request to handoff an existing session from a second basestation;
a session identification generator, invoked by the communications agent if the received request is a request for a new session, to generate a communication session identifier that follows the session and the subscriber unit as the subscriber unit moves from one basestation coverage area to another basestation coverage area;
a security module, invoked by the communications agent if the request to handoff the existing session, to authenticate an existing communication session identifier with the request; and
wherein the session identification generator further composes a deterministic element of the communication session identifier; a random element of the communication session identifier; and
employs a mathematical function to generate the communication session identifier using the deterministic element and the random element.

7. The apparatus of claim 6, wherein the communication session identifier generated by the session identification generator comprises at least a deterministic element and a random element.

8. The apparatus of claim 7, wherein the session identification generator composes the deterministic element using one or more of an electronic serial number (ESN) of the accessing subscriber unit, a media access control (MAC) address of the subscriber unit, and/or a telephone number of the subscriber unit.

9. The apparatus of claim 7, wherein the session identification generator composes the random element of the session identifier utilizing a pseudo-random number generator.

10. The apparatus of claim 7, wherein the session identification generator composes the random element of the session identifier by generating a true random number from radio frequency (RF) thermal noise.

11. An article of manufacture comprising a machine accessible storage medium having stored therein a plurality of executable instructions which, when executed by an accessing computing device, cause an electronic system to:
receive a request to establish an end-to-end network communication session between a subscriber unit in a wireless communication system and a data network access server through a first basestation;
analyze attribute-value pair(s) (AVP) of the received request and identify a callType AVP to determine whether the received request is a request for a new session or a request to handoff an existing session from a second basestation wherein the received request is identified as a request for a new session if the callType AVP is absent from the incoming call request or if an identified callType AVP associated with the received request denotes a new call;
generate, if the received request is a request for a new session, a communication session identifier that follows the session and the subscriber unit as the subscriber unit moves from one basestation coverage area to another basestation coverage area;
authenticate, if the request is a request to handoff the existing session, an existing communication session identifier received with the request; and
wherein generate the communication session identifier further comprises:
compose a deterministic element of the communication session identifier;
compose a random element of the communication session identifier; and
employs a mathematical function to generate the communication session identifier using the deterministic element and the random element.

12. The article of manufacture of claim 11 further to authenticate, if the request is a request to handoff an existing session, an existing and valid communication session identifier received with the request.

13. The article of manufacture of claim 11, wherein the communication session identifier comprises a deterministic element and a random element.

* * * * *